W. F. & C. W. JENKINS.
Plow.
No. 210,203.  Patented Nov. 26, 1878.
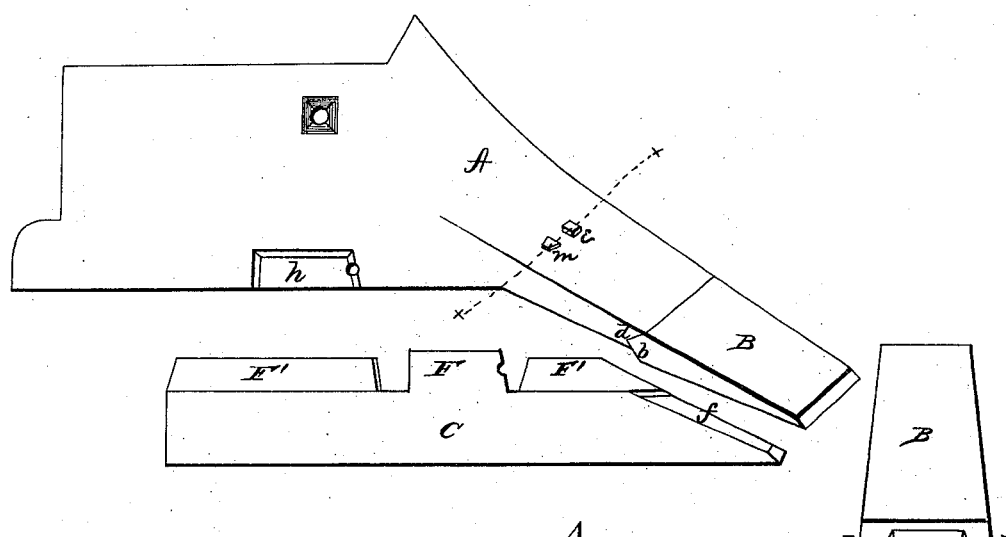
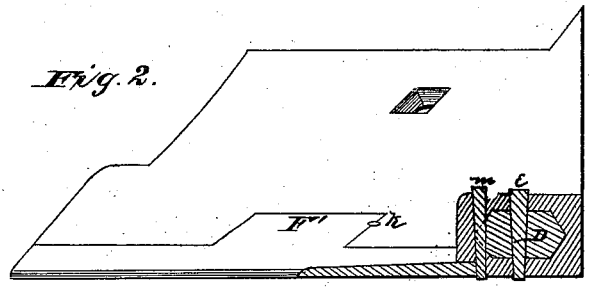
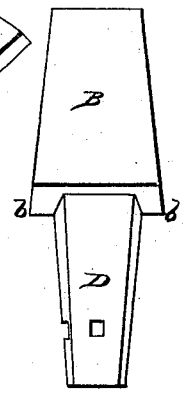
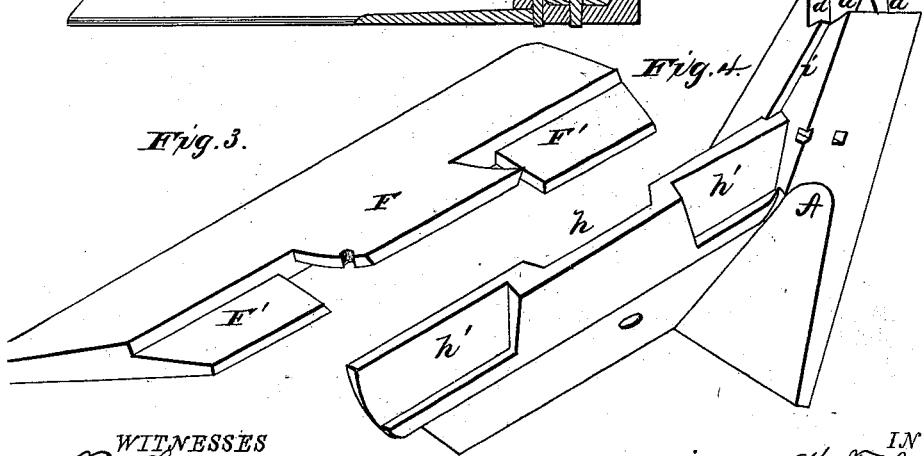
WITNESSES
INVENTOR
By
Attorneys

UNITED STATES PATENT OFFICE.

WILTON F. JENKINS AND CHARLES W. JENKINS, OF RICHMOND, VIRGINIA.

IMPROVEMENT IN PLOWS.

Specification forming part of Letters Patent No. 210,203, dated November 26, 1878; application filed April 19, 1878.

*To all whom it may concern:*

Be it known that we, WILTON F. JENKINS and CHARLES W. JENKINS, of Richmond, in the county of Henrico, and in the State of Virginia, have invented certain new and useful Improvements in Plows; and do hereby declare that the following is a full, clear, and exact description thereof, reference being had to the accompanying drawings, and to the letters of reference marked thereon, making a part of this specification.

The nature of our invention consists in the construction and arrangement of a plowshare with reversible point and removable cutter, as will be hereinafter more fully set forth.

In order to enable others skilled in the art to which our invention appertains to make and use the same, we will now proceed to describe its construction and operation, referring to the annexed drawing, in which—

Figure 1 is a plan view of the share and point with the cutter moved out of its place. Fig. 2 is a section through the line $x\ x$, Fig. 1. Fig. 3 is a perspective view of the cutter. Fig. 4 is a perspective view of the share with the point and cutter removed. Fig. 5 is a view of the point alone.

A represents the share, B the removable and reversible point, and C the removable cutter. The front end of the share A is constructed to receive the point B by having a tapering socket, $a$, formed in the same from the end inward for a suitable distance. The point B is made in wedge form, and provided with a tapering shank, D, having its edges or sides made beveled on both sides. The base or inner end of the point B on each side of the shank D, forms a V-shaped projection, $b$, which enters a corresponding notch, $d$, in the end of the share on each side of the socket $a$.

The point B is securely held in the share by a key, $e$, passed through the socket and shank, as shown.

The socket $a$ in the share is chilled by the use of a chilled core in casting the share, so that the socket will not be liable to wear and become larger.

The cutter C is intended to be used along the edge of the share, and it is formed at its forward end with a beveled shoulder, $f$, corresponding with a shoulder, $i$, on the under side of the share at the front, as shown in Fig. 4.

The body of the cutter C is formed with a center top wing or lap, F, and a bottom wing or lap, F', at each end; and these wings or laps fit in corresponding recesses $h$ and $h'\ h'$, formed respectively in the upper and lower surfaces of the share. By these means the cutter is held in place, and it is locked by means of a key, $k$, passed through the share and one of the wings, as shown.

When the cutter C is worn it can readily be removed for sharpening, or a new cutter substituted, which makes the share as good as a new one.

The removable and reversible point may be used with a solid share—that is, a share without a removable cutter—and the removable cutter may be used without the removable point. When both are used in the same share they may be locked in place by a single key, $m$.

Having thus fully described our invention, what we claim as new, and desire to secure by Letters Patent, is—

1. The combination of the share A, provided with the upper and lower recesses, $h\ h'$, and the removable cutter C, provided with the top and bottom wings or laps, F F', substantially as and for the purposes herein set forth.

2. The combination of the share A, provided with the chilled socket $a$ and recesses $h\ h'$, the reversible plow-point B, with shank D, and the cutter C, with wings or flaps F F', all constructed substantially as and for the purposes herein set forth.

In testimony that we claim the foregoing we have hereunto set our hands this 19th day of April, 1878.

W. F. JENKINS.
C. W. JENKINS.

Witnesses:
FRANK GALT,
JNO. D. PATTEN.